United States Patent [19]
Klös-Hein et al.

[11] Patent Number: 5,189,573
[45] Date of Patent: Feb. 23, 1993

[54] MAGNETIC TAPE CASSETTE APPARATUS WITH A DRIVE MECHANISM WHICH SERVES FOR PLAYING MAGNETIC TAPE CASSETTES

[75] Inventors: Karl Klös-Hein, Wettenberg; Hans-Georg Hermanni, Sinn, both of Fed. Rep. of Germany

[73] Assignee: U.S. Philips Corporation, New York, N.Y.

[21] Appl. No.: 784,724

[22] Filed: Oct. 28, 1991

Related U.S. Application Data

[63] Continuation of Ser. No. 480,427, Feb. 15, 1990, abandoned.

[30] Foreign Application Priority Data

Feb. 15, 1989 [DE] Fed. Rep. of Germany ....... 3904483
May 5, 1989 [DE] Fed. Rep. of Germany ....... 3914789

[51] Int. Cl.$^5$ ............................................. G11B 5/027
[52] U.S. Cl. ........................................ 360/85; 360/93; 360/96.5
[58] Field of Search .................. 360/90, 93, 95, 96.1, 360/96.5, 96.6, 85

[56] References Cited
U.S. PATENT DOCUMENTS

| | | | |
|---|---|---|---|
| 4,308,562 | 12/1981 | Negishi | 360/96.5 X |
| 4,723,185 | 2/1988 | Maeda | 360/93 X |
| 4,752,844 | 6/1988 | Suzuki | 360/96.5 X |
| 4,772,973 | 9/1988 | Ohkita et al. | 360/96.5 X |
| 4,802,039 | 1/1989 | Hatanaka | 360/96.5 |
| 4,825,312 | 4/1989 | Yoshikawa et al. | 360/96.5 |
| 5,018,032 | 5/1991 | Otsuki | 360/96.5 X |

Primary Examiner—Andrew L. Sniezek
Attorney, Agent, or Firm—Brian J. Wieghaus

[57] ABSTRACT

The invention relates to a magnetic tape cassette apparatus with a drive mechanism which serves for playing magnetic tape cassettes, has a cassette loading mechanism to which there belongs a cassette tray (15) which accommodates the magnetic tape cassette and is guided by laterally projecting pins (16) in fixed vertical guideways (6) for the purpose of lowering into a playing position and raising into an eject position, the pins (16) reaching in addition through slots (14) of a slide (9) which slope relative to the vertical, the guideways (6) having have only a vertical longitudinal extension for lowering and raising the cassette tray (15) and the draw-in and eject movement of the magnetic tape cassette being taken over by a cassette catch (17) which is movable by an actuating lever (21) between an eject and a draw-in position, the actuating lever (21) pivotably coupled to the slide (9) simultaneously being moved via the displacement movement of the slide for the purpose of drawing in and ejecting the cassette.

15 Claims, 2 Drawing Sheets

MAGNETIC TAPE CASSETTE APPARATUS WITH A DRIVE MECHANISM WHICH SERVES FOR PLAYING MAGNETIC TAPE CASSETTES

This is a continuation of application Ser. No. 07/480,427 filed Feb. 15, 1990 now abandoned.

BACKGROUND OF THE INVENTION

1. Field of the Invention

The invention relates to a magnetic tape cassette apparatus with a drive mechanism which serves for playing magnetic tape cassettes, has a cassette loading mechanism to which there belongs a cassette tray which accommodates the magnetic tape cassette and is guided by means of laterally projecting pins in fixed vertical guideways for the purpose of lowering into a playing position and raising into an eject position, the pins reaching in addition through slots of a slide which slope relative to the vertical.

2. Art Background

A magnetic tape cassette apparatus of this kind is known from German Patent 3,241,361. Lateral pins of a cassette tray reach through L-shaped slots of a vertical housing part, each of the L-shaped slots having a vertical and a horizontal arm. Slide plates, through which the pins of the cassette tray likewise reach, have oblique slots, all of which slope in the same direction relative to the vertical arms of the L-shaped slots. If the plates having the oblique slots are moved in the draw-in or eject direction, the cassette tray first of all travels with its pins in the horizontal direction as far as the transition region between the horizontal and vertical arms of the L-shaped slots. It then descends in the vertical arms of the L-shaped slots. In this design having a cassette tray which can be displaced in the horizontal and vertical direction, the cassette tray must be guided sufficiently far above the winding spindles in order to avoid collisions. When it is a question of reducing the overall height of a drive mechanism, the compulsory horizontal movement leads inevitably to a greater overall height.

It is furthermore known, from German Patent 3,717,587, to move the cassette tray up and down by means of a lift lever, the lift lever being pivotable about an axis transversely to the draw-in and eject direction of the magnetic tape cassette. The cassette catch is guided in a slot of the lift lever, said slot extending in the draw-in and eject direction. The actuating lever engages on the cassette catch and pushes the latter in the draw-in or eject direction according to a control rod displaceable in the insertion direction.

SUMMARY OF THE INVENTION

It is the object of the invention to provide a magnetic tape cassette apparatus having a drive mechanism of the type mentioned at the outset, in which, in combination with a sufficiently large draw-in and eject path of the magnetic tape cassette, the cassette tray exclusively performs a vertical movement only.

The said object is achieved according to the invention by the fact that the guideways have only a vertical longitudinal extension for lowering and raising the cassette tray and the fact that the draw-in and eject movements of the magnetic tape cassette are taken over by a cassette catch which is movable by an actuating lever between an eject and a draw-in position, the actuating lever pivotably coupled to the slide simultaneously being moved via the displacement movement of the slide for the purpose of draw-in and ejecting the cassette.

In this arrangement, the cassette tray, held so that it can only be raised and lowered, is made independent of the movements of the cassette because the actuating lever can be designed with such a large transmission ratio that it can draw in and eject the cassette by a sufficiently large path length with the aid of the cassette catch alone. Further advantages are the reduction in the overall height and a mechanically simple division into vertical movements of the tray and horizontal movements of the cassette.

According to a further embodiment of the invention, it is envisaged that the cassette catch is guided in a slot of the slide. For this purpose, the slide can, for example, reach beyond the cassette tray.

According to a further embodiment of the invention, it is envisaged that the actuating lever is arranged to be pivotable about a bearing pivot on the chassis of the drive mechanism, said bearing pivot being arranged to the side of the slide and the cassette tray. The mounting of the actuating lever to the side of the slide and the tray displaces the coupling between the slide and actuating lever towards the slide, as a result of which the latter can displace the cassette catch and thereby the cassette by large path lengths in the draw-in and eject direction via a short lever arm between its mounting on the dome and the coupling with the slide on the one hand and a long lever arm between the coupling with the slide and the point of action on the cassette catch on the other hand.

According to a further embodiment of the invention, it is envisaged that a coupling pin is provided on the slide, said coupling pin reaching through a slot of the actuating lever and ensuring that, as the slide is moved in the draw-in or eject direction, the actuating lever pivots about it. A pin on the slide, which reaches through a slot of the actuating lever, represents the simplest kind of coupling between the slide and the actuating lever.

According to a further embodiment of the invention, it is envisaged that on the actuating lever there is provided a return spring by means of which, when the drive mechanism has not been started, the actuating lever pushes the cassette catch into the eject/load position of the cassette. Such a return spring makes it possible, in the event of malfunctions of the drive mechanism, always to push the cassette back into the position from which it can be removed by hand.

According to a further embodiment of the invention, it is envisaged that the actuating lever engages over the bearing pivot by means of a bearing sleeve, which has a projection which forms a side arm for an end arm of the return spring arranged with a helical part between the bearing pivot and the bearing sleeve, and that the other end arm of the return spring reaches behind the coupling pin. As a result of this arrangement, the return spring is only tensioned when the actuating lever is actuated in the draw-in direction and the slide is not simultaneously displaced in the insertion direction. The prestress thereby achieved ensures that by reason of the prestress imparted to the actuating lever, said actuating lever urges the cassette back out of the tray in the event of the slide or driver pin not yielding. On the other hand, the spring is not tensioned if the drawing-in action of the drive mechanism is set in motion and the slide assumes the draw-in movement.

According to a further embodiment of the invention, it is envisaged that in that region in which the pins have lowered the cassette tray almost into the playing position, the slots of the slide bend away towards the insertion side of the loading mechanism into a slot part which slopes slightly relative to the course of the tray, and that when the slide has reached its end position the pins are pressed in the sloping region against the slot walls. By means of the sloping end path of the slide-slot ends it is ensured that the cassette tray is pressed against its support in the playing position. By means of this firm pressing, rattling noises are avoided.

According to a further embodiment of the invention, it is envisaged that a load-exerting spring is provided which, at least at the end of the insertion movement, presses the slide into its rearward end position.

A load-exerting spring of this kind always ensures that the slide reliably reaches its end position and, accordingly, that the cassette tray also is reliably lowered into its playing position.

According to a further embodiment of the invention, it is envisaged that the load-exerting spring has diverging spring arms (hairpin spring), of which a forward arm is supported towards the forward side of the tray on the chassis plate and a rearward arm presses towards the rearward side of the drive mechanism against the slide. Such a load-exerting spring is of simple construction and sufficiently elastic to press the slide and the cassette tray firmly and softly into their playing position.

According to a further embodiment of the invention, it is envisaged that the free end of the rearward spring arm is guided in a guiding slot of the chassis plate, which guiding slot extends in the insertion/eject direction and over which a slide part can travel. The rearward spring arm can thus not escape sideways unintentionally and lose contact with the slide.

The contact force of the load-exerting spring is only necessary at the end of the draw-in movement of the slide and the cassette-lowering movement. During further motional processes of the slide, the load-exerting spring may even get in the way. According to a further embodiment of the invention therefore, it is envisaged that towards the insertion side of the loading mechanism, the guiding slot bends out of its course extending in the eject direction, away from the slide towards the outer side of the loading mechanism, enabling the rearward spring arm to be pressed away sideways by the forward-running slide until the slide runs past the rearward spring arm. During its movement in the eject direction, the slide thus presses the rearward spring arm aside so that, after being pressed aside, the load-exerting spring does not burden further eject movements or the draw-in movement at its inception. Only when the slide has travelled far enough in the draw-in direction does the rearward spring arm move back onto the slide and loads the latter in the draw-in direction.

BRIEF DESCRIPTION OF THE DRAWINGS

The invention is explained in greater detail with reference to the drawings, in which.

DETAILED DESCRIPTION OF THE PREFERRED EMBODIMENT

Each magnetic tape apparatus is provided with a loading mechanism which makes it possible to introduce a magnetic tape cassette into the apparatus and then to transfer the cassette within the apparatus into a playing position, winding spindles (not shown) engaging in the spools of the magnetic tape cassette.

Figure 1:
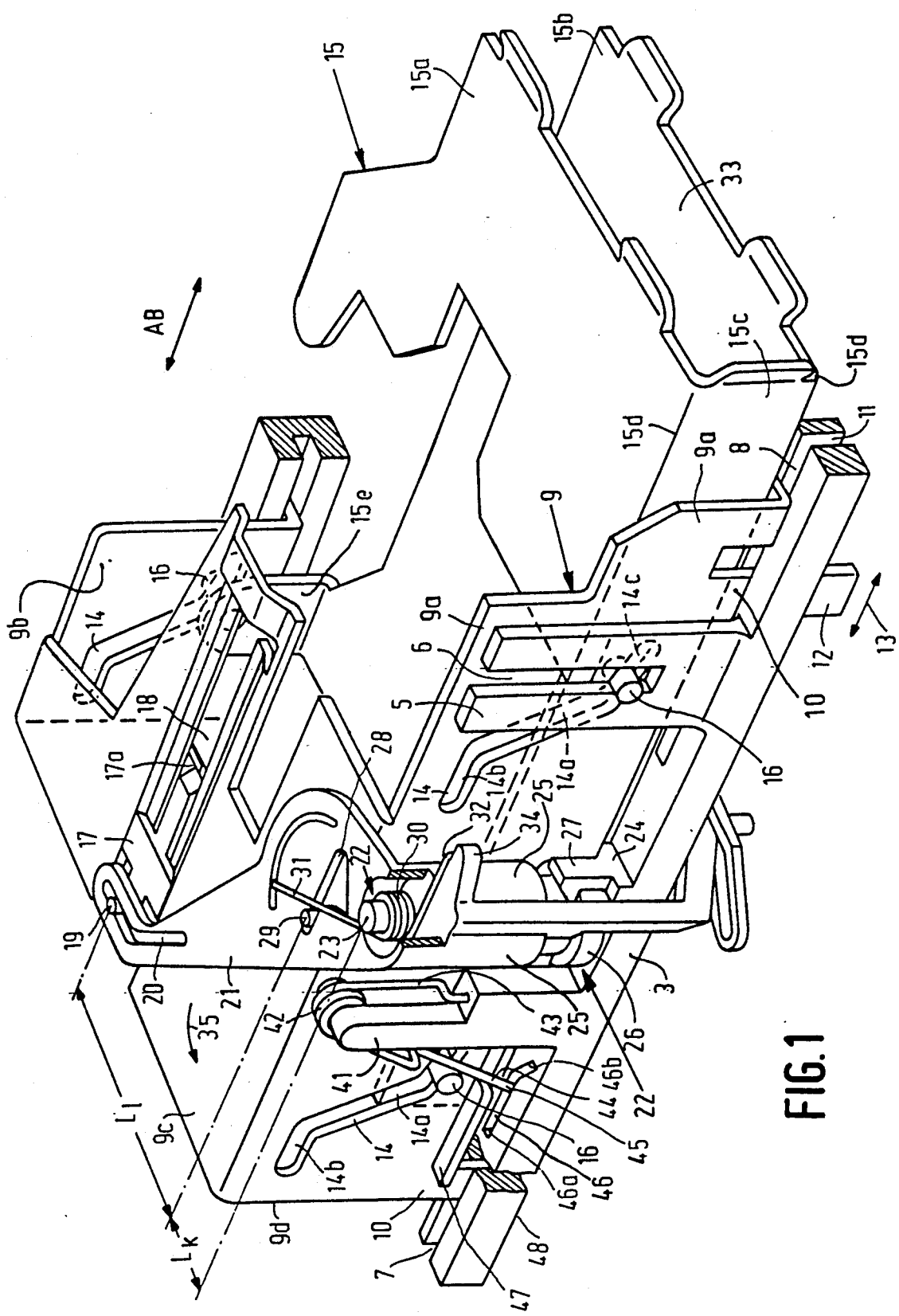
FIG. 1 shows, in diagrammatic representation, a loading mechanism for magnetic tape cassettes which is used in a magnetic tape cassette apparatus and has a slide for raising and lowering a cassette tray.

A loading mechanism of this kind is illustrated diagrammatically in FIG. 1 and constructed on a chassis plate 3 proper to it. At least one vertical supporting plate 5 having an exclusively vertical guideway 6 which forms a supporting-plate slot 6 is provided on the chassis plate 3. Guideways 7 and 8, which guide a slide 9 vertically and resting against the vertical supporting plate 5 in the draw-in and eject direction AB, are provided in the chassis plate 3. The guideways 7 consist of grooves in which webs 10 of the slide 9 are displaceable in the displacement direction AB. Attached to the web 10 in the guideway 8 there is in addition a coupling web 12 which reaches through an opening 11 in the chassis plate 3. The coupling web 12 can be pushed backwards and forwards in a manner not illustrated in the direction of a double arrow 13 by a draw-in mechanism (not illustrated) of the magnetic tape apparatus. The direction of movement corresponds to the draw-in and eject direction AB.

The slide 9 comprises a front slide part 9a and a rear slide part 9b, which are connected via a horizontally extending slide connecting plate 9c. It is likewise possible for a backplate connecting the rear edges to be provided in addition at the rear edges 9d. Lift slots 14 are provided in slide parts 9a, 9b. Each lift slot 14 comprises a central part 14a which slopes relative to the vertical course of the supporting-plate slot 6 by a certain angle of inclination of, for example, 8. All central parts 14a of the slots 14 slope by the same angle of inclination relative to the vertical. The sloping upper ends of the central parts 14a of the lift slots 14 are adjoined by essentially horizontal rearward slot ends 14b which run towards the rearward side of the mechanism and ensure an overstroke tolerance for the eject movement of the slide. The lower ends of the central parts 14a are adjoined by forward slot ends 14c which slope forwards in the lowering direction and ensure an overstroke tolerance for the end of the draw-in movement.

A cassette tray 15 is arranged between the slide plate parts 9a and 9b. This cassette tray 15 essentially comprises two guide plates 15a, 15b, which are arranged at a distance one above the other in horizontal planes and are connected via a guiding plate 15c at longitudinal edges 15d situated on the same side of the drive mechanism. The guiding plate 15c has two pins 16 which protrude laterally from it and engage in that lift slot 14 of the slide which is at the front in the drawing. A lug 15e on the rearward part of the cassette tray 15 is provided with a further pin 16, which engages in that lift slot 14 of the slide part 9b which is at the rear in the drawing. In the forward part of the loading mechanism, at least one pin 16 reaches through the lift slot 14 and the supporting-plate slot 6. The cassette tray 15 is moved up and down by sliding the slide 9 backwards and forwards by means of the coupling web 12 between a first and a second slide position.

A cassette catch 17 which is guided in a guiding slot 18 of the slide connecting plate 9c serves for drawing in and ejecting a cassette. The guiding slot 18 extends in the direction of the double arrows 13 and AB.

The cassette catch 17 is provided with a driver pin 19 which reaches through a slot 20 of an actuating lever 21. This actuating lever 21 has a bearing 22. This bearing 22 comprises an upright bearing pivot 23 which is provided on a support 24 connected to the chassis plate 3. Preferably, the support is an injection-moulded part integrally moulded onto the chassis plate 3. Around the bearing pivot 23 there extends a bearing sleeve 25 which is part of the actuating lever 21. At its lower end, the bearing sleeve has a collar 26, over which a retention hook 27 of the support 24 engages. In the actuating lever 21 there is a guiding slot 28 through which a coupling pin 29 arranged on the slide connecting plate 9c reaches.

The bearing pivot 23 is situated laterally outside the slide 9. The coupling of the slide 9 to the actuating lever 21 via the coupling pin 29 produces two lever arms $L_k$ and $L_l$ of different lengths, which are of significance for the displacement path of the cassette catch 17. Even short slide movements bring about long displacement paths of the cassette catch 17.

A return spring 30 is first of all placed on the bearing pivot 23 in the top part of the bearing 22. The sleeve 25 of the actuating lever 21 reaches beyond this return spring 30, which is designed as a helical spring. The helical spring has an end arm 31 and 32 at each of its ends. As seen from the insertion side 33 of the cassette tray 15, the end arm 31 rests against the coupling pin 29. The other end arm 32 is supported on a side arm 34 of the bearing sleeve 25. The arrangement here acts as return arrangement for the cassette if the draw-in mechanism of the magnetic tape apparatus does not respond.

Arranged in the region of the bearing 22, on a part 41 belonging to the chassis plate 3, is a load-exerting spring 42 which, in the manner of a hairpin spring, has two diverging spring arms, a forward spring arm 43 and a rearward spring arm 44. The forward spring arm is supported on the chassis plate 3 in such a way as to press in the eject direction. The rearward spring arm 44 engages with its free end 45 in a guiding slot 46 of the chassis plate 3. The rearward spring arm 44 presses towards the rearward side 9d of the loading mechanism against a face 47a of a projection 47 of the slide 9. This projection 47 can move over the rearward part 46a of the guiding slot 46, said part extending in the eject direction.

Figure 5:
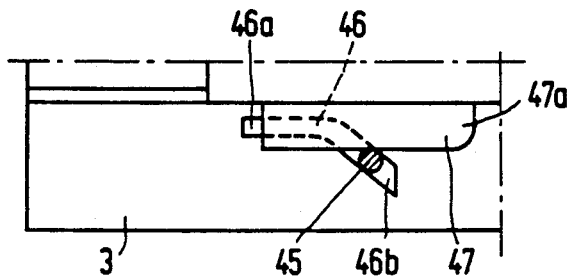
FIG. 5 shows a load-exerting spring pressed sideways out of its operative range.

Towards the front and towards the outer side 48 of the loading mechanism, the guiding slot 46 bends off into a part 46b, enabling the rearward spring arm 44 to be forced away sideways by the forward-travelling projection 47, as can be seen in FIG. 5. After this forcing away, the projection 47 of the slide 9 travels past the free end 45 of the spring arm 44, said end having been forced away outwards.

Figure 2:
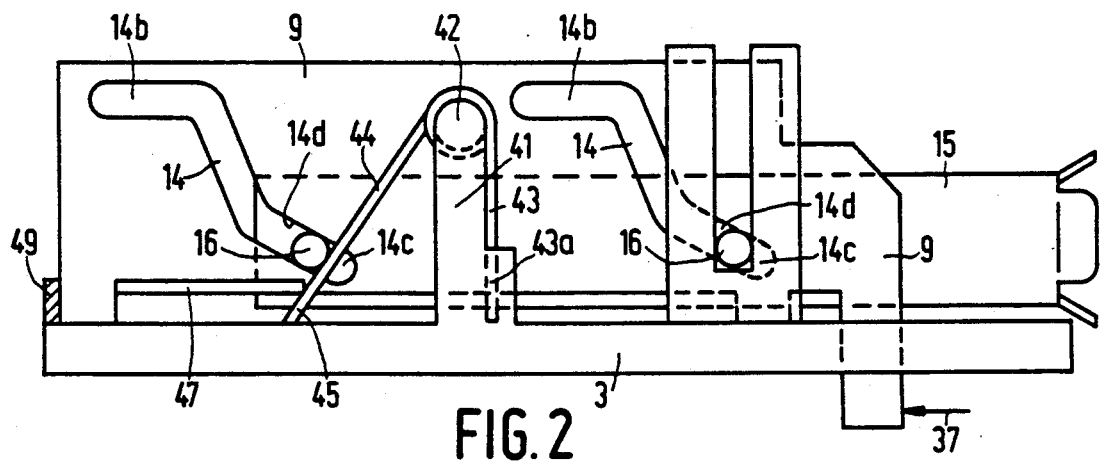
FIGS. 2 and 3 show side views of the loading mechanism in different positions of the cassette tray.
Figure 3:
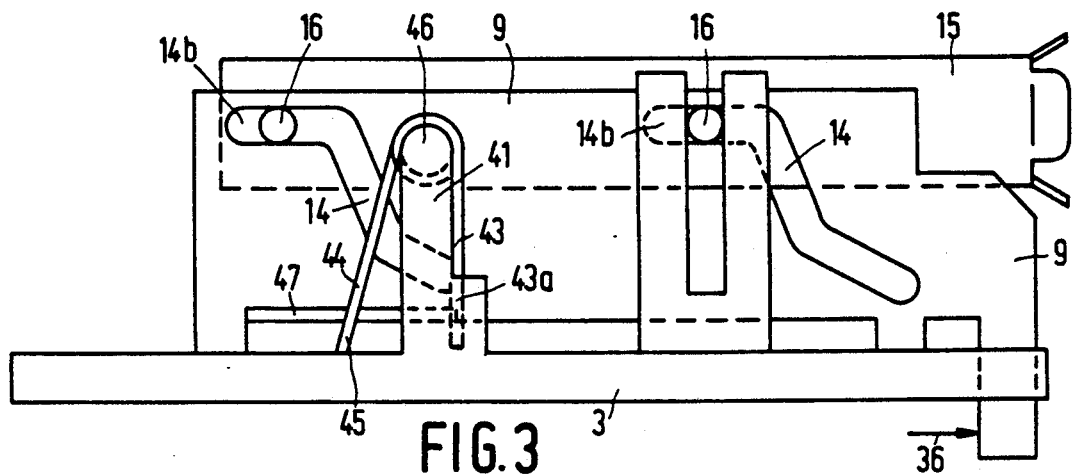
Figure 4:
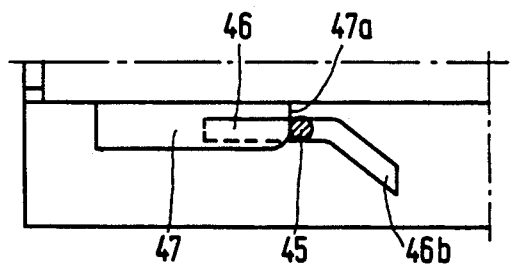
FIG. 4 shows a diagrammatic representation of the guideway of the rearward spring arm of a load-exerting spring which subjects the slide to the load in the draw-in direction at the end of the draw-in movement.

FIGS. 2 and 3 show two positions of the cassette tray 15 in side view, in particular FIG. 2 showing the cassette tray in a lowered position and FIG. 3 showing the cassette tray in a raised position. It can be seen in FIG. 2 that the forward spring arm 43 of the spring 42 is supported with its free end 43a on the chassis plate 3. The rearward spring arm 44 presses against the projection 47 of the slide 9 and thus presses the slide 9 backwards into its rearward end position, formed, for example, by a stop 49. In the rearwardmost end position of the slide 9, illustrated in FIG. 2, the pins 16 are in the sloping slot parts 14c and press against the upper edges 14d of these sloping slot parts 14c. As a result, the cassette tray is pressed firmly against the chassis plate 3 when it is in the playing position, and cannot rattle.

FIG. 3 shows the cassette tray 15 in a raised position, the slide 9 having been pulled forwards in the direction of arrow 36. The pins 16 of the cassette tray are in the rearward slot ends 14b. The end 45 of the rearward spring arm 44 is situated to the side of the slide projection 47 and thus does not subject the latter to a load (FIG. 5).

The cassette loading mechanism operates as follows: a magnetic tape cassette (not illustrated) is pushed into the insertion side 33 of the cassette tray 15. During this procedure, the cassette tray is in the upper position, which can be seen in FIG. 3. The pins 16 of the cassette tray 15 are in the rearward slot ends 14b of the lift slots 14. The winding-spool opening, situated at the front in the insertion direction, of the cassette pushed in (not illustrated) travels under a gripping hook 17a of the cassette catch 17, until the latter drops into the winding-spool opening of the cassette. As pushing in continues, the cassette catch 17 then takes the actuating lever 21 along anticlockwise in the direction of an arrow 35. At this point in time, provision is made for the draw-in mechanism (not illustrated) of the magnetic tape apparatus to be switched on and for the latter to take the coupling web 12 along mechanically in the draw-in direction. If the draw-in mechanism is put into operation and the slide 9 travels towards the rear, the coupling pin 29 also travels towards the rear. The slide can thus travel as far as its rearward end position, the cassette tray 15 being lowered in the guiding slots 6 via the pins 16 and the lift slots 14.

If the loading mechanism does not respond and the slide 9 thus stops in its starting position, the coupling pin 29 also stops and the helical spring 30 is tensioned between the coupling pin 29 and the side arm 34, which pivots in the anticlockwise direction, as the cassette is pushed in by hand. As a consequence, the actuating lever 21 pushes back the cassette as soon as the insertion force exerted by the user's hand pushing in the cassette ceases. In the case of an apparatus fault, the cassette can thus never disappear inside the tray. If, after the manual insertion of a cassette and the starting of the apparatus mechanism (not illustrated), the slide 9 is moved in the draw-in direction, in the direction of an arrow 37, then the cassette tray 15 travels downwards into the position to be seen in FIG. 1 and FIG. 2. In this position, the winding spindles of the magnetic tape apparatus engage in the winding-spools of the lowered magnetic tape cassette. The slide 9 can now perform, in addition, a certain overstroke in the draw-in direction 37 in slot regions 14c, for example in order to compensate tolerances. The slot edges 14d press the pins 16 and hence the cassette tray downwards against the chassis plate 3.

We claim:

1. A magnetic tape cassette apparatus having a loading mechanism, said loading mechanism comprising:
  (a) a chassis having a fixed vertical guideway;
  (b) a slide slidably connected to said chassis for reciprocating movement between a first slide position and a second slide position, said slide including an inclined lift slot;

(c) a cassette tray sized to slidably receive a magnetic tape cassette, said cassette tray including a pin extending laterally into said vertical guideway of said chassis and said inclined lift slot of said slide, during translation of said slide between said first slide position and a second slide position said inclined lift slot acting on said pin of said tray and moving said tray vertically with respect to said chassis between a raised and lowered tray position with said tray pin constrained in said vertical guide;

(d) an actuating lever pivotally mounted on a pivot on said chassis and coupled to said slide; and (e) a cassette catch connected to said actuating lever for engaging and moving the magnetic tape cassette within said tray during movement of said slide between a play position, in which said cassette is fully inserted within said tray, and an eject/load position, in which said cassette partially protrudes from said tray, said cassette catch being connected to said actuating lever at a location more distant from said pivot than said coupling of said slide to said actuating lever such that said cassette catch translates a greater distance than said slide during translation of said slide.

2. The magnetic tape cassette apparatus of claim 1, further comprising a slot formed in said slide for guiding, said cassette catch between said play and eject positions.

3. The magnetic tape cassette apparatus of claim 1, wherein said pivot is a bearing pivot on a lateral portion of said chassis for pivotally mounting said actuating lever to said chassis.

4. The magnetic tape cassette apparatus of claim 3, further comprising:
(a) a coupling slot formed in said actuating lever; and
(b) a coupling pin projecting from said slide and received within said coupling slot so that said actuating lever pivots about said bearing pivot as said slide translates between said first and second slide positions.

5. The magnetic tape cassette apparatus of claim 4, further comprising a return spring including a first portion contacting said actuating lever and a second portion contacting said slide such that when said slide is fixed relative to said chassis and said actuating lever is moved with said cassette catch towards said play position of said cassette catch, said return spring urges said actuating lever and cassette catch into said eject/load position of said cassette catch.

6. The magnetic tape cassette apparatus of claim 5, further comprising:
(a) a bearing sleeve on said actuating lever for contacting said bearing pivot; and
(b) a side arm extending from said bearing sleeve for engaging said first portion of said return spring;
wherein said return spring includes a helical portion disposed about said bearing pivot.

7. The magnetic tape cassette apparatus of claim 1, wherein said inclined lift slot includes an inclined portion and a sloped portion which forms an oblique angle with said inclined portion, such that when said slide is in said second slide position, said pin is located in said sloped portion.

8. The magnetic tape cassette apparatus of claim 7, further comprising a load exerting spring connected to said chassis for urging said slide towards said second slide position when said slide is proximal to said second slide position, and with said slide in said second slide position said load exerting spring biasing an edge of said sloped portion of said lift slot against said tray pin.

9. The magnetic tape cassette apparatus of claim 8, wherein said load exerting spring includes a forward arm fixed relative to said chassis, and a rearward arm contacting said slide for urging said slide towards said second slide position.

10. The magnetic tape cassette apparatus of claim 9, further comprising:
(a) a guiding slot in said chassis; and
(b) a slide part projecting from said slide to overlie a length of said guiding slot, such that a portion of said guiding slot extends parallel to the translation motion of said slide between said first and second slide position, and said rearward spring arm is guided by said guiding slot.

11. The magnetic tape cassette apparatus of claim 10, where said guiding slot includes a portion which extends non-parallel to the translation motion of said slide between said first and second slide position, such that said rearward spring arm is disposed in the nonparallel portion when the slide is in said first slide position.

12. The magnetic tape cassette apparatus of claim 1, further comprising a load exerting spring connected to said chassis for urging said slide towards said second slide position when said slide is proximal to said second slide position.

13. The magnetic tape cassette apparatus of claim 12, wherein said load exerting spring includes a forward arm fixed relative to said chassis, and a rearward arm contacting said slide for urging said slide towards said second slide position.

14. The magnetic tape cassette apparatus of claim 13, further comprising:
(a) a guiding slot in said chassis; and
(b) a slide part projecting from said slide to overlie a length of said guiding slot, such that a portion of said guiding slot extends parallel to the translation motion of said slide between said first and second slide position, and said rearward spring arm is guided by said guiding slot.

15. The magnetic tape cassette loading apparatus of claim 1, further comprising a return spring including a first portion contacting said actuating lever and a second portion contacting said slide such that when said slide is fixed relative to said chassis and said actuating lever is moved towards the play position, the return spring urges said actuating lever and cassette catch into said eject/load position of said cassette catch.

* * * * *